(12) United States Patent
Takeda

(10) Patent No.: US 12,302,178 B2
(45) Date of Patent: May 13, 2025

(54) TERMINAL APPARATUS, BASE STATION APPARATUS, CONTROL METHOD, AND COMPUTER-READABLE STORAGE MEDIUM FOR EXECUTING CONDITIONAL HANDOVER

(71) Applicant: KDDI CORPORATION, Tokyo (JP)

(72) Inventor: Hiroki Takeda, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 17/685,049

(22) Filed: Mar. 2, 2022

(65) Prior Publication Data

US 2022/0191750 A1 Jun. 16, 2022

Related U.S. Application Data

(63) Continuation of application No. PCT/JP2020/034028, filed on Sep. 9, 2020.

(30) Foreign Application Priority Data

Oct. 3, 2019 (JP) .................................. 2019-183267

(51) Int. Cl.
*H04W 36/00* (2009.01)
*H04W 36/36* (2009.01)

(52) U.S. Cl.
CPC ...... *H04W 36/0061* (2013.01); *H04W 36/362* (2023.05)

(58) Field of Classification Search
CPC ......... H04W 36/0005; H04W 36/0011; H04W 36/0016; H04W 36/0033; H04W 36/0044;
(Continued)

(56) References Cited

U.S. PATENT DOCUMENTS

| 11,057,863 B2 | 7/2021 | Moriwaki et al. |
| 11,272,417 B2 | 3/2022 | Chen et al. |

(Continued)

FOREIGN PATENT DOCUMENTS

| CN | 102415153 A | 4/2012 |
| CN | 105578536 A | 5/2016 |

(Continued)

OTHER PUBLICATIONS

Ericsson, "Stage-2 aspects of Conditional Handover in NR", 3GPP TSG RAN WG2 #106 R2-1906209, May 2019, 6 pages.
(Continued)

*Primary Examiner* — Matthew W Genack
(74) *Attorney, Agent, or Firm* — Foley & Lardner LLP

(57) ABSTRACT

A terminal apparatus obtains, from a base station apparatus that is currently connected to the terminal apparatus, a communication parameter that is to be used when the terminal apparatus is connected to a candidate base station apparatus that is a candidate for handover destination and a condition for executing handover to the candidate base station apparatus; and transmits, to the candidate base station apparatus, a message that includes identification information associated with the obtained communication parameter, when handover to the candidate base station apparatus is performed based on the obtained condition.

19 Claims, 6 Drawing Sheets

(58) Field of Classification Search
CPC ......... H04W 36/0061; H04W 36/0083; H04W 36/00835; H04W 36/16; H04W 36/24; H04W 36/26; H04W 36/30; H04W 36/34; H04W 36/36; H04W 36/38

See application file for complete search history.

(56) References Cited

U.S. PATENT DOCUMENTS

| | | | |
|---|---|---|---|
| 2009/0149162 A1* | 6/2009 | Tenny | H04W 76/20 455/414.1 |
| 2012/0034920 A1 | 2/2012 | Inumaru | |
| 2013/0003673 A1* | 1/2013 | Dinan | H04L 5/0023 370/329 |
| 2013/0077547 A1* | 3/2013 | Kodama | H04W 52/0229 370/311 |
| 2013/0212195 A1* | 8/2013 | Bonefas | H04L 67/63 709/206 |
| 2016/0219604 A1* | 7/2016 | Fujishiro | H04W 36/30 |
| 2017/0164265 A1* | 6/2017 | Dai | H04L 61/5007 |
| 2017/0280310 A1* | 9/2017 | Jain | H04W 4/90 |
| 2018/0124774 A1* | 5/2018 | Takahashi | H04B 7/0645 |
| 2018/0249382 A1* | 8/2018 | Yang | H04W 36/00837 |
| 2019/0159117 A1* | 5/2019 | Kuge | H04W 48/17 |
| 2019/0208498 A1 | 7/2019 | Moriwaki et al. | |
| 2019/0223073 A1 | 7/2019 | Chen et al. | |
| 2019/0289662 A1* | 9/2019 | Ishikura | H04W 72/0446 |
| 2021/0314911 A1 | 10/2021 | Moriwaki et al. | |
| 2022/0150780 A1 | 5/2022 | Chen et al. | |

FOREIGN PATENT DOCUMENTS

| | | |
|---|---|---|
| CN | 109691195 A | 4/2019 |
| CN | 111567093 A | 8/2020 |
| EP | 4 017 112 A1 | 6/2022 |
| JP | 2017-531398 A | 10/2017 |
| WO | WO-2010/126070 A1 | 11/2010 |
| WO | WO-2019/137453 A1 | 7/2019 |

OTHER PUBLICATIONS

Nokia, Nokia Shanghai Bell, Intel Corporation, "Baseline CR for introducing Rel-16 NR mobility enhancement", 3GPP TSG-RAN WG3 Meeting #104 R3-193147, May 2019, 31 pages.

Oppo (rapporteur), "Summary of [106#42] [NR/LTE/mob enh] CHO configuration", 3GPP TSG-RAN WG2 Meeting #107 R2-1909676, Aug. 2019, 26 pages.

Ericsson, "Conditional handover failures in LTE", 3GPP TSG RAN WG2 #106 R2-1906199, May 2019, 7 pages internet URL:https://www.3gpp.org/ftp/tsq_ran/WG2_RL2/TSGR2_106/Docs/R2-1906199.zip.

Qualcomm Incorporated, "Conditional HO to improve mobility robustness", 3GPP TSG-RAN WG2 Meeting #106 R22-1905788, May 2019, 4 pages internet URL:https://www.3gpp.org/ftp/tsg_ran/WG2 RL2/TSGR2 106/Docs/R2-1905788.zip.

Extended European Search Report issued in corresponding European Patent Application No. 20871860.1, dated Oct. 14, 2022 (10 pages).

Kddi Corporation: "Discussion on a configuration mismatch between a UE and a target gNB," 3GPP Draft; R2-1913675_KDDI_CHO_MISMATCH, 3RD Generation Partnership Project (3GPP) 3GPP TSG-RAN WG2 Meeting #107bis Chongqing, China, Oct. 14-18, 2019; Retrieved from the Internet: URL:https://ftp.3gpp.org/tsg_ran/WG2_RL2/T SGR2_107bis/Docs/R2-1913675.zip R2-1913675_KDDI_CHO_mismatch.docx Oct. 4, 2019 (3 pages).

Nokia et al: "Configuration Management for Conditional Handover," 3GPP TSG-RAN WG2 Meeting #101 Athens, Greece, Feb. 26,-Mar. 2, 2018; R2-1803347; Retrieved from the Internet: URL:http://www.3gpp.org/ftp/tsg%5Fran/WG2%5FRL2/TSGR2%5F101/Docs/ on Feb. 16, 2018 (3 pages).

Oppo (rapporteur), "Summary of [106#42] [NR/LTE/mob enh] CHO configuration", 3GPP TSG-RAN WG2 Meeting #107, R2-1911733, Aug. 2019, 26 pages.

Office Action issued in corresponding European Patent Application No. 20871860.1, dated Jul. 10, 2023 (7 pages).

Oppo, "Further consideration on CHO configuration update", 3GPP TSG-RAN WG2 Meeting #107 R2-1909679, Aug. 26-30, 2019, Prague, Czech Republic (3 pages).

* cited by examiner

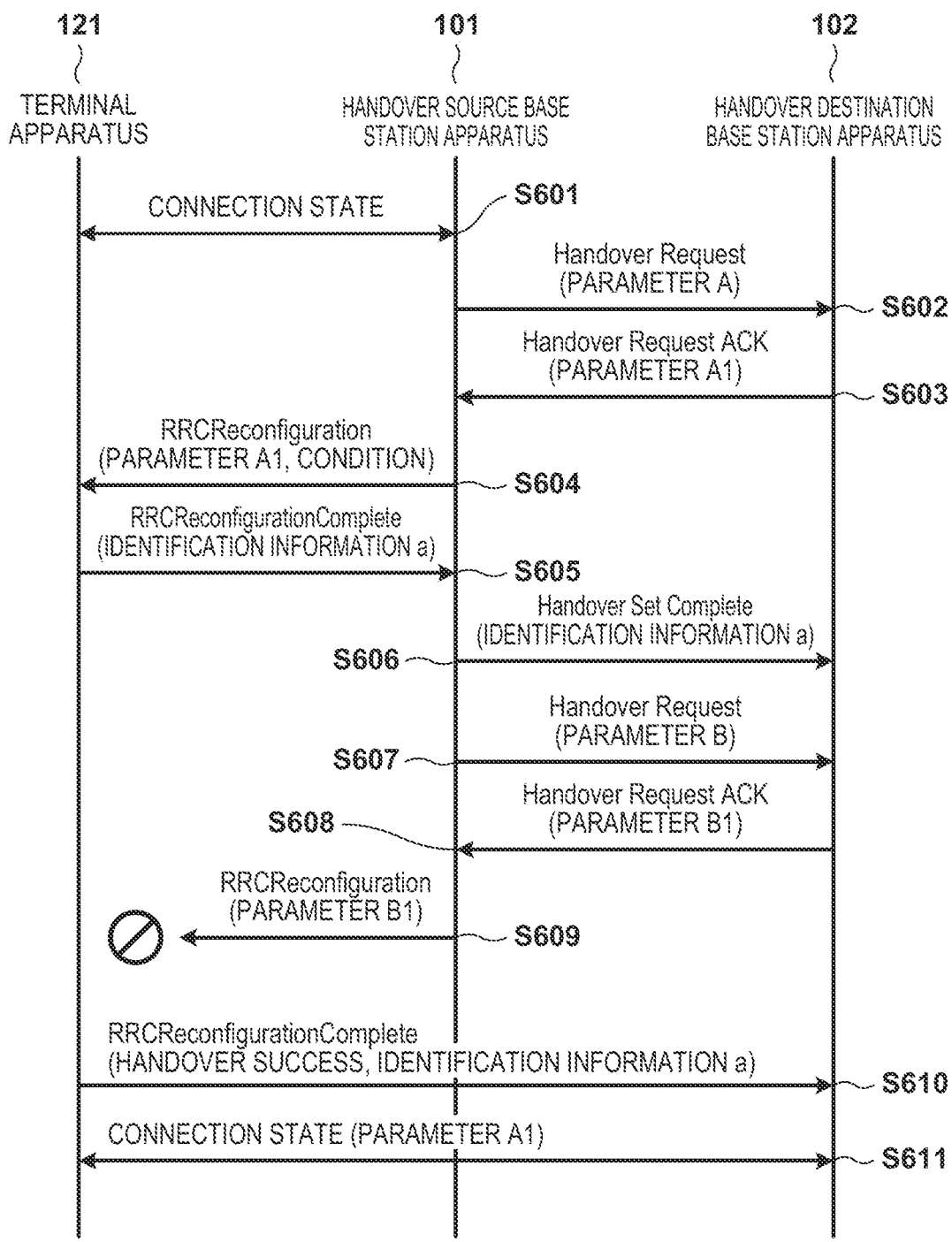

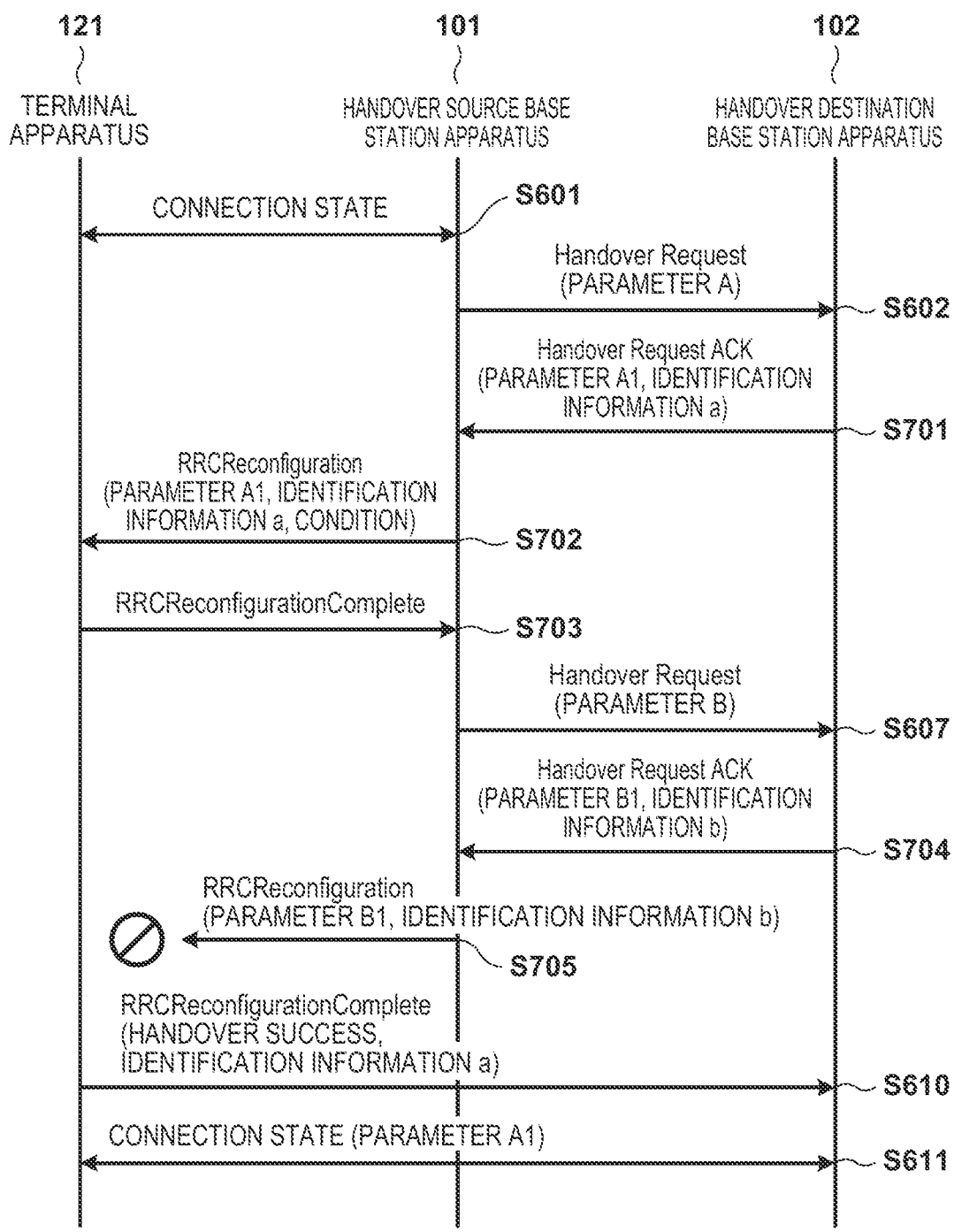

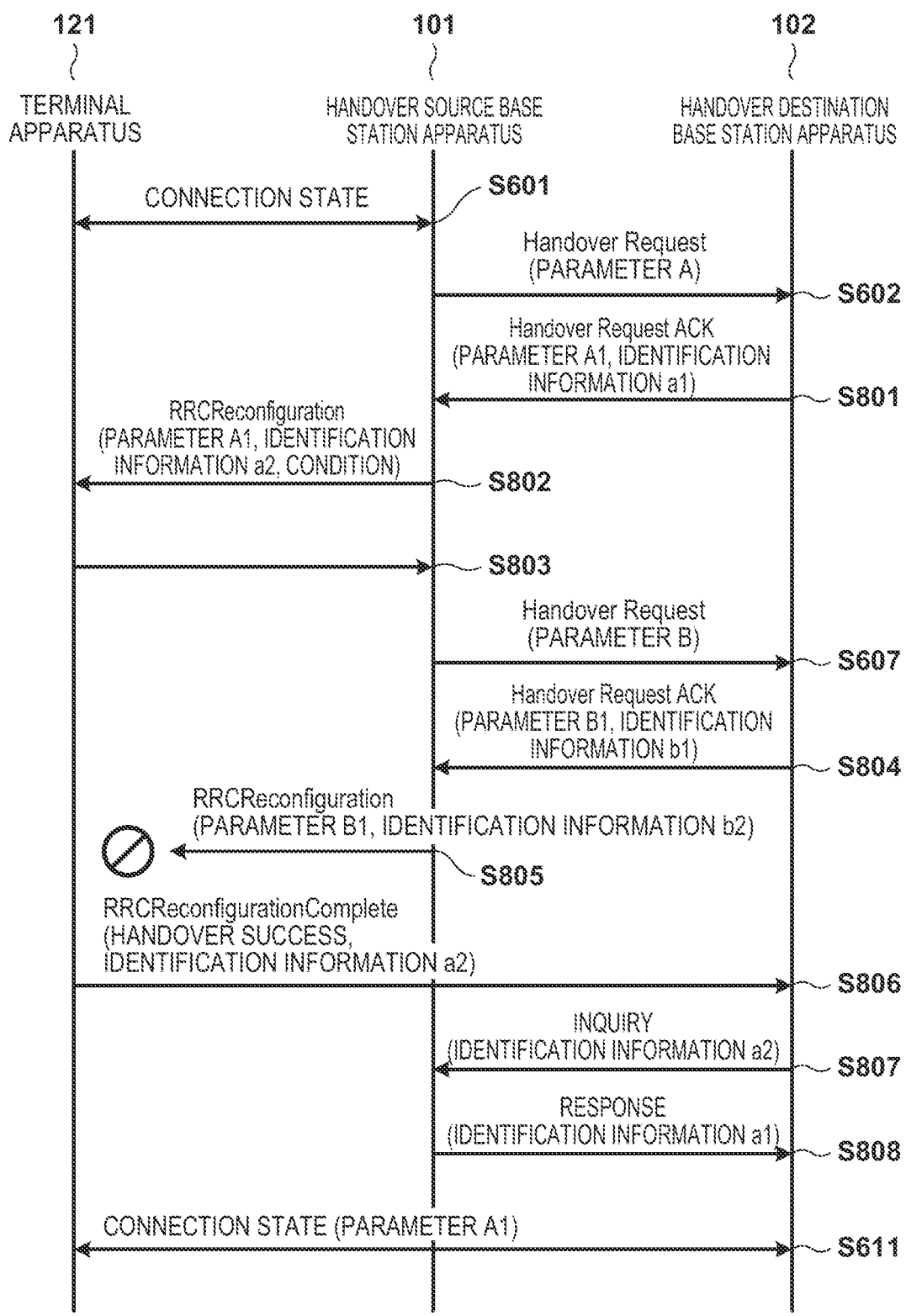

ial Patent Application No. PCT/JP2020/034028 filed on Sep. 9, 2020, which claims priority to and the benefit of Japanese Patent Application No. 2019-183267 tiled Oct. 3, 2019, the entire disclosures of which are incorporated herein by reference.

TERMINAL APPARATUS, BASE STATION APPARATUS, CONTROL METHOD, AND COMPUTER-READABLE STORAGE MEDIUM FOR EXECUTING CONDITIONAL HANDOVER

CROSS-REFERENCE TO RELATED APPLICATION(S)

This application is a continuation of International Patent Application No. PCT/JP2020/034028 filed on Sep. 9, 2020, which claims priority to and the benefit of Japanese Patent Application No. 2019-183267 tiled Oct. 3, 2019, the entire disclosures of which are incorporated herein by reference.

BACKGROUND OF THE INVENTION

Field of the Invention

The present invention relates to a terminal apparatus, a base station apparatus, a control method, and a program, and in particular relates to a conditional handover technique.

Description of the Related Art

In a cellular communication system, handover processing for sequentially switching base station apparatuses to which a terminal apparatus is connected is executed in order to maintain connection even when the terminal apparatus moves. In order to shorten the period of a switch, by such handover processing, of a base station apparatus to which the terminal apparatus is connected a technique has been discussed in which a communication parameter for communication between a base station apparatus that is a handover source and a base station apparatus that is a handover destination and a condition on which handover is to be executed are provided to the terminal apparatus in advance, and when the terminal apparatus confirms that the condition is satisfied, handover is autonomously executed. This technique is called conditional handover. In conditional handover, a base station apparatus that is a handover source inquires of base station apparatuses that are candidates for handover destination about respective communication parameters that are to be used for communication with a terminal apparatus, and obtains communication parameters when these candidate base station apparatuses and the terminal apparatus are connected (see 3GPP contribute articles, R2-1906209 and R3-193147). The base station apparatus that is a handover source then notifies the terminal apparatus of these communication parameters. In addition, a communication parameter that is to be used by a terminal apparatus for communication with a base station apparatus that is a handover candidate can be changed before handover is actually executed (see 3GPP contribute article, R2-1909676).

There can be cases where, when a communication parameter that is to be used by a terminal apparatus for communication with a base station apparatus that is a handover candidate is changed, before the change of the communication parameter is notified to the terminal apparatus, the terminal apparatus executes conditional handover using a communication parameter before the change. In this case, parameter mismatch can occur as a result of the candidate base station apparatus using the changed communication parameter while the terminal apparatus uses the communication parameter before the change.

SUMMARY OF THE INVENTION

The present invention provides a technique for preventing mismatch between communication parameters that are respectively used by a terminal apparatus and a base station apparatus that is a handover destination during conditional handover.

A terminal apparatus according to one mode of the present invention includes: an obtaining unit configured to obtain, from a base station apparatus that is currently connected to the terminal apparatus, a communication parameter that is to be used when the terminal apparatus is connected to a candidate base station apparatus that is a candidate for handover destination and a condition for executing handover to the candidate base station apparatus; and a transmitting unit configured to transmit, to the candidate base station apparatus, a message that includes identification information associated with the communication parameter, when handover to the candidate base station apparatus is performed based on the condition.

A base station apparatus according to one mode of the present invention is a base station apparatus that is a candidate for destination of handover to be performed by a terminal apparatus, the base station apparatus including: a notification unit configured to notify the terminal apparatus of a communication parameter that is to be used when the terminal apparatus is connected to the base station apparatus, via another base station apparatus that is currently connected to the terminal apparatus; a receiving unit configured to receive, from the terminal apparatus, a message that includes identification information associated with the communication parameter notified from the other base station apparatus to the terminal apparatus, when the terminal apparatus executes handover to the base station apparatus; and a communication unit configured to communicate with the terminal apparatus using the communication parameter if the identification information included in the message is associated with the communication parameter notified by the notification unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 6 is a diagram showing an example of flow of processing that is executed by the system.

FIG. 7 is a diagram showing an example of flow of processing that is executed by the system.

FIG. 8 is a diagram showing an example of flow of processing that is executed by the system.

DESCRIPTION OF THE EMBODIMENTS

Figure 1:
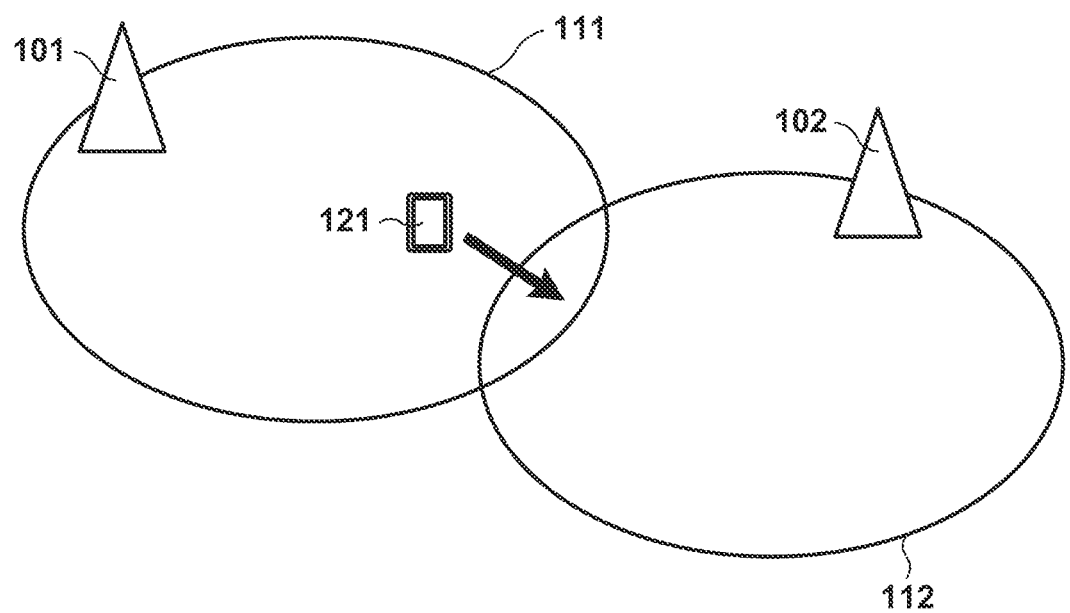
FIG. 1 is a diagram showing a configuration example of a wireless communication system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

FIG. 1 shows a configuration example of a wireless communication system according to an embodiment of the present invention. Note that, in the example in FIG. 1, two base station apparatuses and one terminal apparatus are illustrated, but, as a matter of course, there may be a larger number of base station apparatuses and terminal apparatuses than those illustrated.

A base station apparatus 101 and a base station apparatus 102 are wireless base station apparatuses in a fifth-generation (5G) cellular communication system, for example. The base station apparatuses 101 and 102 are configured to be communicable with a terminal apparatus that is present in a cell 111 and a cell 112 that respectively represent ranges in which the base station apparatuses 101 and 102 can perform communication. A terminal apparatus 121 is connected to a base station apparatus that provides a cell that includes a position at which the terminal apparatus 121 is present, and thereby can perform wireless communication. Note that the terminal apparatus 121 can suppress the power consumption by transitioning to a standby state (for example, an RRC_Idle state or an RRC_Inactive state) when there is no user data that is to be transmitted/received, but, in the present embodiment, the terminal apparatus 121 enters a connection state (for example, an RRC_Connected state), establishes connection with a base station apparatus, and performs communication.

In the present embodiment, it is assumed that the terminal apparatus 121 moves while being connected to the base station apparatus 101 that forms the cell 111, and enters the range of the cell 112 that is formed by the base station apparatus 102. In this case, as the terminal apparatus 121 moves, the wireless quality of wireless communication with the base station apparatus 101 deteriorates and the wireless quality of a wireless signal from the base station apparatus 102 improves, and thereby the terminal apparatus 121 performs a switch of base station apparatus to which the terminal apparatus 121 is connected, that is in other words handover. At this time, this handover may be performed by a handover source, namely the base station apparatus 101 transmitting a handover instruction to the terminal apparatus 121, but handover may be autonomously started when it is determined that a predetermined condition is satisfied by the terminal apparatus 121. Autonomous handover that is performed when the condition is satisfied by the terminal apparatus 121 may be called "conditional handover". In the present embodiment, the terminal apparatus 121 executes this conditional handover.

In conditional handover, for each of one or more candidate base station apparatuses that are candidates for handover destination, the terminal apparatus 121 obtains information regarding a communication parameter that is to be used when the terminal apparatus 121 is connected to that candidate base station apparatus, from the base station apparatus 101 that the terminal apparatus 121 is currently connected. Note that, in the present embodiment, the base station apparatus 102 is the candidate base station apparatus. In an example, a communication parameter is a parameter for wireless resource control (RRC) and includes a frequency bandwidth that is used for communication, the number of layers of MIMO (Multi-Input Multi-Output), and the like.

This information regarding a communication parameter may be information regarding a communication parameter that can be used by a candidate base station apparatus, and with which the base station apparatus 101 that is currently connected to the terminal apparatus 121 can achieve the communication quality achieved in communication that is currently executed with the terminal apparatus 121, and, for example. Thus, for example, the base station apparatus 101 that is currently connected to the terminal apparatus 121 may provide a communication parameter that is currently used with the terminal apparatus 121, to the candidate base station apparatus (the base station apparatus 102), and obtain a communication parameter that can achieve communication performance similar to that corresponding to the provided communication parameter, from the candidate base station apparatus, as a communication parameter that is to be used when the terminal apparatus 121 and the candidate base station apparatus are connected. The base station apparatus 102 may notify the base station apparatus 101 of the same communication parameter as the communication parameter notified from the base station apparatus 101, for example. In addition, the base station apparatus 102 may notify the base station apparatus 101 of a communication parameter that is significantly different from the same communication parameter as the communication parameter notified from the base station apparatus 101, but that can achieve the same communication performance, or may notify the base station apparatus 101 of a communication parameter only a portion of which is different from the communication parameter notified from the base station apparatus 101, for example. In an example, the base station apparatus 102 may notify the base station apparatus 101 of information indicating the difference from the communication parameter notified from the base station apparatus 101. In addition, the base station apparatus 102 may, for example, periodically notify the base station apparatus 101 of a communication parameter that is to be used, without being notified of a communication parameter from the base station apparatus 101. In this manner, the base station apparatus 101 transfers information regarding a communication parameter obtained from the base station apparatus 102 to the terminal apparatus 121.

The terminal apparatus 121 executes processing for autonomously switching a base station apparatus to which the terminal apparatus 121 is connected, to the base station apparatus 102, for example, in accordance with a condition that the wireless quality of a wireless signal from the base station apparatus 102 is sufficiently higher than the wireless quality of a wireless signal from the base station apparatus 101 being satisfied by using this information regarding the communication parameter. In conditional handover, the terminal apparatus 121 transmits a handover success message (for example, an "RRC Reconfiguration Complete" message) to the base station apparatus 102 in accordance with a determination that handover to the base station apparatus 102 is to be performed, and handover is completed by the base station apparatus 102 accepting this message.

Here, information regarding a condition for the terminal apparatus 121 to execute handover is notified to the terminal apparatus 121 by the base station apparatus 101 (a handover source) that is currently connected to the terminal apparatus 121. The base station apparatus 101 may notify that a value obtained by subtracting the wireless quality off wireless signal from the base station apparatus 101 from the wireless quality of a wireless signal from the base station apparatus 102 measured by the terminal apparatus 121 needs to exceed a predetermined value, as a condition of handover, for example. At this time, the base station apparatus 101 may set the same predetermined value for all of the candidate base station apparatuses, for example, but may set a predetermined value different for each candidate base station apparatus. The base station apparatus 101 specifies wireless quality at which communication that uses a communication parameter notified from each candidate base station apparatus will be sufficiently successful, based on the communication parameter, and may set a higher predetermined value for higher wireless quality, for example. A configuration may be adopted in which, for example, the predetermined value is set higher for a candidate base station apparatus whose communication parameter represents a high likelihood of failure in demodulating a signal due to the number of layers of MIMO being large, such that handover is started after wireless quality on the candidate base station apparatus side is sufficiently high. In addition, a configuration may also be adopted in which the predetermined value is set higher for a candidate base station apparatus that uses a communication parameter that cannot achieve the communication performance achieved in the current communication, making it difficult for the terminal apparatus 121 to perform handover to the candidate base station apparatus. This enables the terminal apparatus 121 to be connected to a candidate base station apparatus that can achieve the same communication performance as the current communication performance. In addition, if there is a candidate base station apparatus that is to be preferentially connected, the base station apparatus 101 may set the predetermined value for the candidate base station apparatus lower, making it easy to perform handover to this candidate base station apparatus. Note that a condition that is always constant may be used, and, in this case, information regarding the condition does not need to be notified from the base station apparatus 101 to the terminal apparatus 121.

In communication with the terminal apparatus 121, for example, the base station apparatus 101 may change the communication parameter, for example, addition of a wireless bearer during communication. In such a case, for example, the base station apparatus 101 may notify a candidate base station apparatus (the base station apparatus 102) of the changed communication parameter, obtain, from that candidate base station apparatus, a changed communication parameter that is to be used when connected to the terminal apparatus 121, and notify the terminal apparatus 121 of the changed communication parameter. Accordingly, in conditional handover, the terminal apparatus 121 can establish connection with the candidate base station apparatus using the changed communication parameter.

On the other hand, in conditional handover, the base station apparatus 101 and the base station apparatus 102 cannot be aware of, in advance, the timing when the condition is satisfied in the terminal apparatus 121. Thus, handover may occur during processing for changing the communication parameter, and mismatch of communication parameters may occur between the terminal apparatus 121 and the base station apparatus 102 that is a handover destination.

If, for example, handover processing is started during a period from when the base station apparatus 102 transmits a changed communication parameter to the base station apparatus 101 until when the communication parameter reaches the terminal apparatus 121, the terminal apparatus 121 may use a communication the parameter before the change to communicate with the base station apparatus 102, and the base station apparatus 102 may use the changed communication parameter Such an event may occur, for example, when handover is executed. while the wireless quality between the base station apparatus 101 and the terminal apparatus 121 is reduced and the terminal apparatus 121 is failing to receive the changed communication parameter. In this case, communication parameters that are used by the terminal apparatus 121 and the base station apparatus 102 are different, and thus communication between these apparatuses cannot be performed.

In addition, when the terminal apparatus 121 successfully receives a changed communication parameter, the terminal apparatus 121 transmits, to the base station apparatus 101, information indicating that the changed communication parameter was successfully received, and the base station apparatus 10/ transfers the information to the base station apparatus 102, whereby, when the terminal apparatus 121 performs handover in a state where the base station apparatus 102 has not received the information, the base station apparatus 102 can use a communication parameter before change. However, for example, there are cases where, in spite of a fact that the terminal apparatus 121 has successfully received a changed communication parameter, the base station apparatus 101 fails to receive information indicating that the changed communication parameter has been successfully received, and, as a result, such information is not transmitted to the base station apparatus 102. In this case, the terminal apparatus 121 uses the changed communication parameter, while the base station apparatus 102 that is a handover destination uses the communication parameter before change, and thus communication between these apparatuses fails.

In the present embodiment, in order to prevent such communication parameter mismatch, when the terminal apparatus 121 executes handover, identification information associated with a communication parameter that is to be used after handover is notified to the base station apparatus 102 that is a handover destination. Notification of this identification information is included in handover success message, for example.

In accordance with a communication parameter being received from the base station apparatus 101 to which the terminal apparatus 121 is currently connected, for example, the terminal apparatus 121 generates identification information corresponding to the communication parameter, and notifies the base station apparatus 101 of the generated identification information. In addition, the base station apparatus 101 may notify the base station apparatus 102 of the notified identification information. That is to say, the terminal apparatus 121 may notify the generated identification information to a candidate base station apparatus that has determined a communication parameter corresponding to the identification information, via the base station apparatus 101 to which the terminal apparatus 121 is currently connected. The terminal apparatus 121 then transmits, to the base station apparatus 102 that is a handover destination, a handover success message that includes identification information corresponding to the most recent communication parameter that the terminal apparatus 121 has, regarding the base station apparatus 102 that is a handover destination, for example. Accordingly, as a result of the terminal apparatus 121 transmitting the identification information in the handover success message, the base station apparatus 102 that is a handover destination can recognize which communication parameter the terminal apparatus 121 is to use for connection with the base station apparatus 102. If, for example, the received identification information is associated with the most recent communication parameter that is managed by the base station apparatus 102, the base station apparatus 102 can recognize that the terminal apparatus 121 is attempting communication that uses the communication parameter, and can execute communication that uses the communication parameter after handover. On the other hand, for example, a configuration may be adopted in which, if the identification information is associated with a past first communication parameter, which is updated to a second communication parameter, but identification information associated with the (second) communication parameter has not been received, the base station apparatus 102 performs communication using the second communication parameter when unknown identification information is received from the terminal apparatus 121. In addition, when a handover success message to which unknown identification information is added is received, the base station apparatus 102 may discard the message. In addition, the base station apparatus 102 may separately notify the terminal apparatus 121 of a communication parameter that is to be used, for example.

In addition, a configuration may also be adopted in which the base station apparatus 102 that is a candidate for handover destination generates identification information along with communication parameters, and notify the terminal apparatus 121 thereof via the base station apparatus 101. In this case, identification information is associated with all of the generated communication parameters, and thus the base station apparatus 102 can appropriately select a communication parameter that is to be used, based on identification information included in a handover success message from the terminal apparatus 121. Assuming that, for example, first identification information is associated with the first communication parameter and second identification information is then associated with the second communication parameter to which the first communication parameter is updated, when a holdover success message that includes the first identification information is received, the base station apparatus 102 can communicate with the terminal apparatus 121 using the first communication parameter. Note that, if a handover success message that includes unknown identification information is received, the base station apparatus 101 may discard the message. In addition, if a handover success message that includes first identification information associated with a past communication parameter is received, the base station apparatus 102 may discard the message.

In addition, the base station apparatus 102 notifies the first identification information associated with a communication parameter to the base station apparatus 101 that is currently connected to the terminal apparatus 121, and the base station apparatus 101 generates second identification information associated with the first identification information, and share it with the terminal apparatus 121. When the handover condition is satisfied, the terminal apparatus 121 transmits a handover success message that includes this second identification information, to the base station apparatus 102. Note that the second identification information may be, for example, an RRC Transaction ID in an RRC message when the base station apparatus 101 notifies the terminal apparatus 121 of a communication parameter. That is to say, when a communication parameter is notified to the terminal apparatus 121, an RRC message is transmitted, and an RRC Transaction ID is given to the message. Thus, this RRC Transaction ID may be used as the second identification information. Upon receiving a handover success message that includes the second identification information, the base station apparatus 102 notifies the base station apparatus 101 of the second identification information. Then, the base station apparatus 101 may notify the base station apparatus 102 of third identification information associated with the second identification information. If the third identification information matches the first identification information, the base station apparatus 102 specifies that a communication parameter associated with the first identification information is being used by the terminal apparatus 121. In this manner, the base station apparatus 102 can specify which communication parameter the received identification information is associated with, via the base station apparatus 101 that is a handover source.

In this manner, when executing conditional handover, the terminal apparatus 121 notifies the base station apparatus 102 that is a handover destination of identification information associated with a communication parameters that the terminal apparatus 121 could receive. Accordingly, the base station apparatus 102 can recognize that the terminal apparatus 121 is about to perform post-handover communication using the communication parameter associated with this identification information. Then, the base station apparatus 102 can communicate with the terminal apparatus 121 that performed handover, using the communication parameter associate with the identification information. The base station apparatus 102 holds histories of past communication parameters, for example, whereby, when identification information associated with a past communication parameter is received, the base station apparatus 102 can communicate with the terminal apparatus 121 using the past communication parameter. Note that the base station apparatus 102 does not need to hold past communication parameters, and, in this case, when a handover success message that includes identification information associated with a past communication parameter is received, the message can be discarded. Similarly, a handover success message that includes identification information that the base station apparatus 102 cannot recognize is received, the base station apparatus 102 may discard the message. Accordingly, communication can be prevented from being attempted in a state where communication parameters do not match between the terminal apparatus 121 and the base station apparatus 102.

Apparatus Configuration

Figure 2:
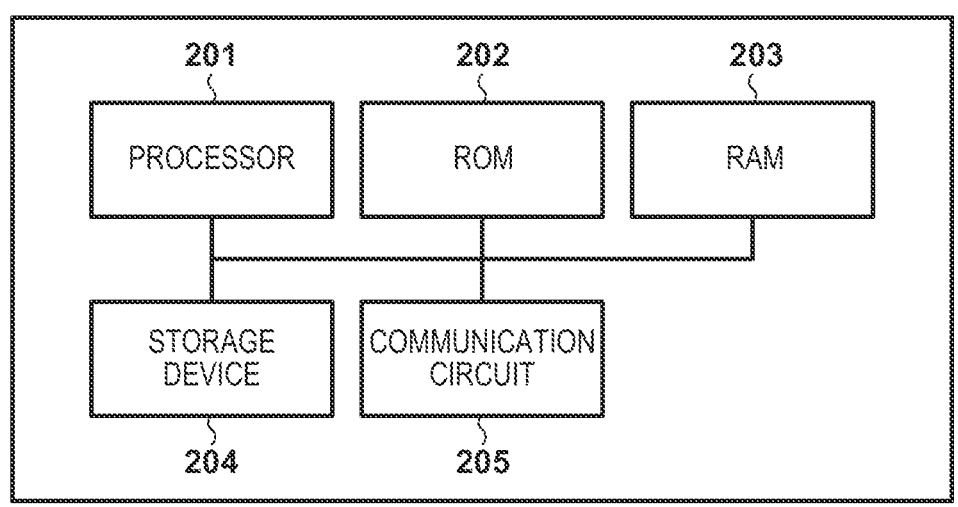
FIG. 2 is a diagram showing an exemplary hardware configuration of a base station apparatus and a terminal apparatus.

FIG. 2 shows an exemplary hardware configurations of a base station apparatus (the base station apparatus 10/ of the base station apparatus 102) and a terminal apparatus according to the present embodiment. These apparatuses each includes a processor 201, a ROM 202, a RAM 203, a storage device 204, and a communication circuit 205, in an example. The processor 201 is a computer constituted by one or more processing circuits such as a general-purpose CPU (Central Processing Unit) and an ASIC (application-specific integrated circuit), and executes overall processing of the base station apparatuses/terminal apparatus and each process described above by reading out and executing a program stored in the ROM 202 or the storage device 204. The ROM 202 is a read only memory that stores information such as programs and various parameters related to processing that is performed by the base station apparatus/terminal apparatus. The RAM 203 is a random access memory that functions as a work space when the processor 201 executes a program, and stores temporary information. The storage device 204 is constituted by a detachable external storage apparatus, for example. The communication circuit 205 is constituted by a circuit for wireless communication, for example. The base station apparatus/terminal apparatus are each constituted by, for example, a baseband circuit, an RF circuit, and the like for cellular communication and an antenna, as the communication circuit 205 for communication with another apparatus. Note that FIG. 2 illustrates one communication circuit 205, but the base station apparatuses/terminal apparatus may each include a plurality of communication circuits. In addition to the communication circuit for communication with the terminal apparatus, for example, each base station apparatus may include a wired or wireless communication circuit for communication with another base station apparatus. Moreover, in addition to the communication circuit for communication with the base station apparatuses, the terminal apparatus may include a communication circuit for a wireless LAN, for example.

Figure 3:
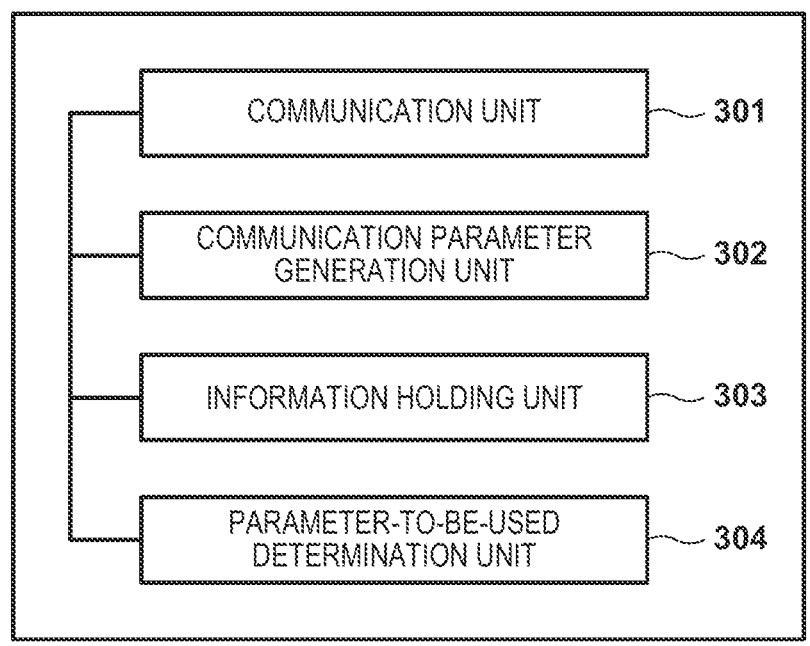
FIG. 3 is a diagram showing a configuration example of a base station apparatus that is a candidate for handover destination.

FIG. 3 shows an exemplary functional configuration of a base station apparatus (the base station apparatus 102) that is a handover candidate according to the present embodiment. The candidate base station apparatus includes, as functions thereof, a communication unit 301, a communication parameter generation unit 302, an information holding unit 303, and a parameter-to-be-used determination unit 304, for example. Note that these functions may be realized by the processor 201 executing a program stored in the ROM 202 or the storage device 204, or may also be realized by dedicated hardware, for example. FIG. 3 illustrates functions related to a technique according to the present embodiment, and the base station apparatus has functions of an ordinary base station apparatus as a matter of course.

The communication unit 301 is a function unit for executing wireless communication with the terminal apparatus 121, for example. The communication unit 301 can perform wireless communication, for example, using a wireless communication method according to which a terminal apparatus can execute handover to an adjacent base station apparatus, such as a fifth generation cellular communication method. Note that, in the present embodiment, a fifth generation cellular communication method is used, but a communication method of each generation such as a third-generation wireless communication method, a long-term evolution communication method, or a fifth generation or later wireless communication method may be used, and a communication method other than a cellular communication method may also be used. In addition, the communication unit 301 also has a function of executing wired or wireless communication with another base station apparatus (the base station apparatus 101). The communication unit 301 performs communication with another base station apparatus through an interface between base station apparatuses stipulated by a cellular communication standard, for example.

The communication parameter generation unit 302 generates a communication parameter that is to be used for communication when the terminal apparatus 121 is connected to the base station apparatus 102. The communication parameter generation unit 302 generates a communication parameter, for example, in accordance with the terminal apparatus 121 receiving a handover request for conditional handover from the base station apparatus 101 to which the terminal apparatus 121 is currently connected, adds information regarding the generated communication parameter to a response signal to the handover request, and transmits the response signal. Note that the handover request may include information regarding a communication parameter that is being used by the base station apparatus 101 for communication with the terminal apparatus 121, and, in this case, the communication parameter generation unit 302 can generate a communication parameter that is to be used for communication when the terminal apparatus 121 is connected to the base station apparatus 102, based on this received communication parameter. The communication parameter generation unit 302 generates a communication parameter, for example, such that communication performance that is equivalent to communication performance obtained in communication between the base station apparatus 101 and the terminal apparatus 121 can be achieved. Then, the communication parameter generation unit 302 may notify the base station apparatus 101 of the value of the difference between the communication parameter received from the base station apparatus 101 and the generated communication parameter, for example. In this case, the base station apparatus 101 specifies a communication parameter that is to be used by the base station apparatus 102, based on the communication parameter notified to the base station apparatus 102 and the value of the difference (for example, by adding these values). Note that the communication parameter generation unit 302 may notify the base station apparatus 101 of the generated communication parameter itself. Note that a configuration may also be adopted in which the communication parameter generation unit 302 generates a communication parameter and identification information associated with the communication parameter, and notify the base station apparatus 101 thereof. Note that the communication parameter (and identification information as necessary) notified to the base station apparatus 101 is transferred to the terminal apparatus 121 by the base station apparatus 101. Note that identification information may be generated by the base station apparatus 101, and, in this case, for example, the identification information may be notified to the base station apparatus 102 at the time of a handover request. In this case, the communication parameter generation unit 302 does not need to generate identification information.

The information holding unit 303 holds a communication parameter generated by the communication parameter generation unit 302 and identification information associated with the communication parameter. Note that, for example, when storing identification information generated by the communication parameter generation unit 302, the information holding unit 303 stores the identification information and the communication parameter generated along with that identification information in association. In addition, when identification information notified from the terminal apparatus 121 via the base station apparatus 101 is obtained, the information holding unit 303 stores the identification information in association with the previous communication parameter transmitted to the terminal apparatus 121 via the base station apparatus 101.

The parameter-to-be-used determination unit 304 determines a communication parameter that is to be used for communication with the terminal apparatus 121, based on identification information included in a handover success message from the terminal apparatus 121. If the received identification information is held in the information holding unit 303, the parameter-to-be-used determination unit 304 determines a communication parameter associated with that identification information, as a communication parameter that is to be used for communication with the terminal apparatus 121, for example. In addition, if the received identification information is not held in the information holding unit 303 and the most recent communication parameter that is not associated with identification information is present, the parameter-to-be-used determination unit 304 determines that this communication parameter is a communication parameter to be used for communication with the terminal apparatus 121. Note that, if the received identification information is not held in the information holding unit 303, the parameter-to-be-used determination unit 304 may discard the handover success message. In addition, a configuration may be adopted in which the parameter-to-be-used determination unit 304 transfers, to the base station apparatus 101, identification information included in the handover success message from the terminal apparatus 121, obtains other identification information from the base station apparatus 101, and determines a communication parameter that is to be used, in accordance with whether or not the other identification information is held in the information holding unit 303. If the other identification information obtained from the base station apparatus 101 is held in the information holding unit 303, for example, the parameter-to-be-used determination unit 304 determines that a communication parameter associated with the other identification information is a communication parameter that is to be used for communication with the terminal apparatus 121. In addition, if the other identification information obtained from the base station apparatus 101 is not held in the information holding unit 303, the parameter-to-be-used determination unit 304 may discard the handover success message. In addition, a configuration may be adopted in which, if the other identification information obtained, from the base station apparatus 101 is not held in the information holding unit 303, the parameter-to-be-used determination unit 304 generates a communication parameter that is to be used for communication with the terminal apparatus 121, notifies the terminal apparatus 121 of the communication parameter as a response to the handover success message, and starts communication. At this time, the base station apparatus 102 may inquire the base station apparatus 101 about a communication parameter used for communication with the terminal apparatus 121 and generate a communication parameter for communication with the terminal apparatus 121.

Figure 4:
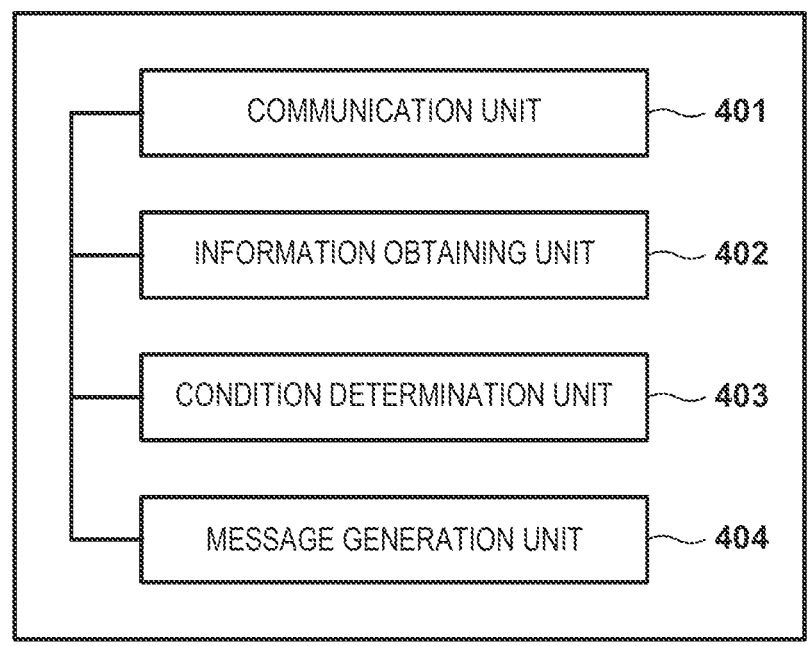
FIG. 4 is a diagram showing a configuration example of a terminal apparatus.

FIG. 4 is a diagram showing an exemplary functional configuration of a terminal apparatus. The terminal apparatus includes a communication unit 401, an information obtaining unit 402, a condition determination unit 403, and a message generation unit 404, for example. Functions of these units may be realized by the processor 201 executing a program stored in the ROM 202 or the storage device 204, for example, or may also be realized by dedicated hardware. Note that FIG. 4 illustrates functions related to a technique according to the present embodiment, and the terminal apparatus has functions of an ordinary terminal apparatus as a matter of course.

The communication unit 401 is a function unit for executing wireless communication with a base station apparatus, for example. The communication unit 401 can perform wireless communication by using a wireless communication method according to which a terminal apparatus can move to an adjacent cell, in a cellular communication method of each generation such as a third generation wireless communication method, a long term evolution communication method, or a fifth generation wireless communication method. Note that a method other than the cellular communication method may also be used.

Regarding at least one candidate base station apparatus (for example, the base station apparatus 102) that is a candidate for handover destination, the information obtaining unit 402 obtains information regarding a communication parameter that is to be used when connected to the candidate base station apparatus, from the base station apparatus 101 that is currently connected to the terminal apparatus. Note that this communication parameter is received, for example, from each candidate base station apparatus via the base station apparatus 101 that is currently connected to the terminal apparatus. In addition, the information obtaining unit 402 may obtain a condition for autonomously starting handover, for example, from the base station apparatus 101 that is currently connected to die terminal apparatus. Note that the condition may be defined for each candidate base station apparatus or may be defined in common with some or all candidate base station apparatuses. In addition, if identification information associated with a communication parameter is generated by each candidate base station apparatus, the information obtaining unit 402 may obtain the identification information along with the communication parameter. In addition, when a communication parameter from one of the candidate base station apparatuses is obtained, the information obtaining unit 402 may generate and obtain identification information associated with that communication parameter, for example. When identification information is generated in this manner, the generated identification information is notified to the base station apparatus 101 by the message generation unit 404 to be described later, before handover is executed. When a communication parameter is received in an RRC Reconfiguration message from the base station apparatus 101, identification information may be notified to the base station apparatus 101 by an RRC Reconfiguration Complete message that is a response to that message, for example.

In addition, when a candidate base station apparatus generated identification information, the information obtaining unit 402 may share other identification information different from this identification information, with the base station apparatus 101 that is currently connected to the terminal apparatus. The information obtaining unit 402 may obtain an RRC Transaction ID of an RRC message when obtaining information regarding a communication parameter of a candidate base station apparatus from the base station apparatus 101, as the other identification information, for example. In addition, a configuration may be adopted in which, as described above, the information obtaining unit 402 generates and obtains other identification information in accordance with a communication parameter being received, and notifies the generated identification information to the base station apparatus 101, thereby sharing this other identification information with the base station apparatus 101.

The condition determination unit 403 determines whether or not a condition for starting handover obtained by the information obtaining unit 402 has been satisfied, for example. The condition determination unit 403 measures the wireless quality of a wireless signal from the base station apparatus 102 and the wireless quality of a wireless signal from the base station apparatus 101 that is currently connected to the terminal apparatus, and determines whether or not to start handover, based on the measured value and the condition notified in relation to the base station apparatus 102, for example. The condition determination unit 403 can determine that handover is to be started, for example, when the difference between the wireless quality of a wireless signal from the base station apparatus 102 and the wireless quality of a wireless signal from the base station apparatus 101 exceeds a predetermined value, when the wireless quality of a wireless signal from the base station apparatus 101 is lower than a predetermined level, when the wireless quality of a wireless signal from the base station apparatus 102 exceeds a predetermined level, and the like.

When the condition for conditional handover is satisfied and handover processing is started, the message generation unit 404 generates a handover success message that includes identification information associated with the communication parameter notified from the base station apparatus that is a destination of the handover, for example. When the communication parameter and the identification information are received from the base station apparatus 102 (via the base station apparatus 101), the message generation unit 404 generates a handover success message that includes the identification information, for example. In addition, also when the terminal apparatus generates identification information in accordance with a communication parameter being received from the base station apparatus 102, the message generation unit 404 may generate a handover success message that includes this identification information. Note that, in this case, the message generation unit 404 may generate a message for notifying the base station apparatus 101 of the identification information, in accordance with a communication parameter being received, before handover processing is started. When a communication parameter that is to be used for communication with the base station apparatus 102 is received in an RRC Reconfiguration message from the base station apparatus 101, for example, the message generation unit 404 generates an RRC Reconfiguration Complete message that includes identification information generated in association with the communication parameter. In addition, the message generation unit 404 may generate a handover success message that includes identification information (for example, an RRC Transaction ID) that is shared with the base station apparatus 101 only, for example. In this case, the base station apparatus 102 is not aware of that identification information in advance, but can recognize which communication parameter the handover success message corresponds to, by making an inquiry to the base station apparatus 101 that is a handover source. The handover success message generated by the message generation unit 404 is transmitted to the base station apparatus 102 via the communication unit 401. In addition, for example, a message for performing notification of identification information may be transmitted to the base station apparatus 101.

Figure 5:
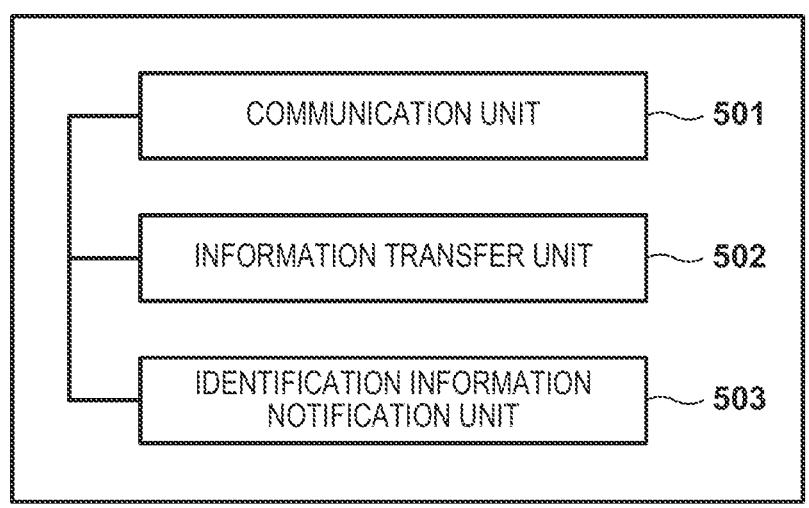
FIG. 5 is a diagram showing a configuration example of a base station apparatus that is a handover source.

FIG. 5 is a diagram showing an exemplary functional configuration of the base station apparatus 101 that is a handover source. The base station apparatus 101 includes a communication unit 501, an information transfer unit 502, and an identification information notification unit 503, for example. Functions of these units may be realized by the processor 201 executing a program stored in the ROM 202 or the storage device 204, for example, or may be realized by dedicated hardware. Note that FIG. 5 illustrates functions related to the technique according to the present embodiment, and the terminal apparatus has functions of an ordinary terminal apparatus as a matter of course. Note that the base station apparatus operates as a base station apparatus that is a handover source when viewed from a terminal apparatus that is currently connected to the base station apparatus, and operates as a base station apparatus that is a handover destination when viewed from a terminal apparatus that is currently connected to another base station apparatus. Thus, the base station apparatus may be configured to have both of functions in FIGS. 3 and 5.

The communication unit 501 is similar to the communication unit 301 in FIG. 3. The information transfer unit 502 receives a communication parameter and identification information from a base station apparatus that is a handover candidate, and transfers the communication parameter and the identification information to a terminal apparatus, for example. In addition, when identification information is generated in accordance with the terminal apparatus receiving a communication parameter, the information transfer unit 502 may transfer the identification information generated by the terminal apparatus to the candidate base station apparatus. Note that the information transfer unit 502 is configured to transfer at least a communication parameter received from the candidate base station apparatus, to the terminal apparatus, and does not need to transfer identification information. The identification information notification unit 503 receives, from a base station apparatus to which handover was performed by the terminal apparatus that has been connected to the base station apparatus (that includes this identification information notification unit 503) to this point, identification information included in a handover success message transmitted from the terminal apparatus to the base station apparatus (that is a handover destination), for example, and specifies other identification information corresponding to the received identification information. The identification information notification unit 303 then notifies the specified other identification information, to the base station apparatus that is a handover destination. Note that, when identification information that is common between the base station apparatus that is a handover destination and the terminal apparatus is used, the identification information notification unit 503 may be omitted.

Flow of Processing

Next, several examples of flow of processing that is executed according to the present embodiment will be described. Note that the following processing is merely exemplary, and, for example, aforementioned deformations may be made, and information may be transmitted using a message that is different from various messages to be described below.

FIG. 6 shows an example in which the terminal apparatus 121 generates identification information in accordance with receiving a communication parameter. In this processing, as an initial state, the terminal apparatus 121 and the base station apparatus 101 are in a connection state (step S601), and are performing user data communication. At this time, for example, the base station apparatus 101 notifies a communication parameter A that is being used at this time point to the base station apparatus 102 that is a candidate for handover destination, and transmits a handover request message (step S602). The base station apparatus 102 then transmits, to the base station apparatus 101, a response message that includes a communication parameter A1 that can achieve communication performance that is equivalent to the communication performance corresponding to this notified communication parameter, for example (step S603). The base station apparatus 101 transfers the obtained communication parameter A1 to the terminal apparatus 131 (step S604). Transfer of this communication parameter A1 can be performed using an RRC message such as an RRC Reconfiguration message. Note that, for example, the base station apparatus 101 can also perform notification of a condition for determining whether or not the terminal apparatus 121 also autonomously executes handover at the time of first notification of a communication parameter. Note that this is merely exemplary, and a communication parameter and a condition may be separately notified.

In accordance with receiving the communication parameter A1, the terminal apparatus 121 generates identification information a associated with the communication parameter A1, and notifies the identification information a to the base station apparatus 101 that is currently connected to the terminal apparatus 121 (step S605). This notification of the identification information a can be performed using an RRC message such as an RRC Reconfiguration Complete message. The base station apparatus 101 transfers the received identification information a to the base station apparatus 102 (step S606). Due to the procedure in steps S602 to S606, the communication parameter A1 and the identification information a associated therewith are shared between the terminal apparatus 121 and the base station apparatus 102 that is a handover destination.

Thereafter, for example, when a change in the communication parameter such as an increase in the wireless bearer is performed between the base station apparatus 101 and the terminal apparatus 121 that is currently connected to the base station apparatus 101, similarly to step S602, the base station apparatus 101 notifies the base station apparatus 102 of a changed communication parameter B (step S607). The base station apparatus 101 then obtains, from the base station apparatus 102, information regarding a communication parameter B1 that corresponds to the communication parameter B and is to be used for communication with the terminal apparatus 121 (step S608). The base station apparatus 101 then transfers this obtained communication parameter B1 to the terminal apparatus 121 (step S609). Note that, here, it is assumed that, for example, due to deterioration in the wireless environment, transfer of the communication parameter B1 from the base station apparatus 101 to the terminal apparatus 121 fails.

Here, it is assumed that the terminal apparatus 121 determines that the handover start condition is satisfied, before the communication parameter B1 is successfully received, and starts processing for performing handover to the base station apparatus 102. In this case, the terminal apparatus 121 determines that the communication parameter A1 that is the most recent from among communication parameters received from the base station apparatus 102 via the base station apparatus 101 is to be used, for example. As a result, the terminal apparatus 121 transmits, to the base station apparatus 102, a handover success message that includes the identification information a associated with the communication parameter A1 (step S610). Note that the handover success message can be a RRC Reconfiguration Complete message, for example. Upon receiving this message, the base station apparatus 102 confirms that the identification information a is included, and determines that communication with the terminal apparatus 121 is to be performed using the communication parameter A1 associated therewith. Accordingly, connection for communication that uses a parameter A1 is established between the terminal apparatus 121 and the base station apparatus 102, (step S611).

Note that this processing example can also apply when the terminal apparatus 121 has started handover in a state where the communication parameter B1 cannot be received in step S609, but this communication parameter B1 has been successfully received, and when handover is started in a state where identification information b (not illustrated) associated with the communication parameter B1 does not reach the base station apparatus 101 (or the base station apparatus 102). In step S610, for example, upon receiving a handover success message that includes the identification information b, the base station apparatus 102 may determine that the communication parameter B1 that is not associated with identification information is to be used since the identification information b is unknown identification information. In this case, connection for communication that uses a parameter B1 is established between the terminal apparatus 121 and the base station apparatus 102. Note that, when a handover success message that includes unknown identification information is received, the base station apparatus 102 may discard this message. In addition, when a handover success message that includes unknown identification information is received, the base station apparatus 102 may newly generate a communication parameter that is to be used for communication with the terminal apparatus 121, notify the terminal apparatus 121 of the generated communication parameter, and start communication.

In addition, in step S606, the base station apparatus 101 does not need to hold the received identification information a and transfer it to the base station apparatus 102. In this case, for example, as will be described later with reference to FIG. 8, when a handover success message that includes the identification information a is received, the base station apparatus 102 may transmit this identification information a to the base station apparatus 101, perform an inquiry, and specify the communication parameter A1 associated with the identification information a. Accordingly, connection for communication that uses the parameter A1 can be established between the terminal apparatus 121 and the base station apparatus 102.

Next, a processing example in which, when generating a communication parameter, the base station apparatus 102 also generates identification information, and notifies the identification information to the base station apparatus 101 and the terminal apparatus 121 will be described with reference to FIG. 7. Note that processing similar to processing in FIG. 6 is given the same reference sign, and a description thereof is omitted.

In the present embodiment, when the communication parameter A1 that can achieve communication performance that is equivalent to the communication performance corresponding to the communication parameter A received from the base station apparatus 101 is generated, the base station apparatus 102 generates the identification information a associated with the communication parameter A1. The base station apparatus 102 then notifies the base station apparatus 101 of the generated communication parameter A1 and the identification information a (step S701). The base station apparatus 101 then transfers this communication parameter A1 and the identification information a to the terminal apparatus 121 (step S702), and receives a response signal from the terminal apparatus 121 (step S703). Note that, in this processing example, at this time point, the communication parameter A1 and the identification information a associated therewith are shared between the terminal apparatus 121 and the base station apparatus 102, and thus notification of information from the base station apparatus 101 to the base station apparatus 102 as in step S606 does not need to be performed.

Subsequently, as a communication parameter of communication between the base station apparatus 101 and the terminal apparatus 121 is changed, the base station apparatus 102 generates a new communication parameter B1 and identification information b associated therewith, and performs notification to the base station apparatus 101 (step S704). The base station apparatus 101 then transfers this received information to the terminal apparatus 121 (step S705). Here, assuming that the terminal apparatus 121 started handover processing before this information is successfully received, similarly to the case in FIG. 6, the terminal apparatus 121 transmits, to the base station apparatus 102, a handover success message that includes the identification information a associated with the communication parameter A1 (step S610), and connection for communication that uses the communication parameter A1 is established (step S611).

Note that, in this processing example, the terminal apparatus 121 successfully receives the communication parameter B1 and the identification information b thereof, but even when handover is started in a state where a response signal for notifying the success (not illustrated) does not reach the base station apparatus 101, the relationship between the communication parameter B1 and the identification information b is shared between the terminal apparatus 121 and the base station apparatus 102. Thus, when the terminal apparatus 121 transmits a handover success message that includes the identification information b, the base station apparatus 102 can determine that the communication parameter B1 associated with the identification information b is to be used.

Next, a processing example when identification information that is shared between the base station apparatus 101 and the base station apparatus 102 is different from identification information that is shared between the terminal apparatus 121 and the base station apparatus 101 will be described with reference to FIG. 8. Note that processing that is similar to the processing in FIG. 6 is given the same reference sign, and a description thereof is omitted.

In this processing example, the base station apparatus 102 generates the communication parameter A1 and the identification information a1 associated therewith, and performs notification to the base station apparatus 101 (step S801). The base station apparatus 101 stores this identification information a1, and, on the other hand, transfers the communication parameter A1 to the terminal apparatus 121 while sharing other identification information a2 with the terminal apparatus 121 (step S802). The base station apparatus 101 then receives a response signal from the terminal apparatus 121 (step S803). Note that the identification information a2 at this time may be generated by the base station apparatus 101 and notified to the terminal apparatus 121, but may be identification information that is assigned during communication, such as an RRC Transaction ID. The base station apparatus 101 stores the identification information a2 shared with the terminal apparatus 121, in association with the identification information a1 shared with the base station apparatus 102. Similarly, when the communication parameter is changed, the base station apparatus 102 notifies the base station apparatus 101 of the communication parameter B1 and the identification information b1, associated therewith (step S804), and the base station apparatus 101 notifies the terminal apparatus 121 of the changed communication parameter B1 while sharing the other identification information b2 with the terminal apparatus 121 (step S805).

Here, it is assumed that the terminal apparatus 121 starts processing for performing handover to the base station apparatus 101, before information regarding the communication parameter B1 is successfully received. In this case, when the communication parameter A1 was obtained immediately before, the terminal apparatus 121 transmits, to the base station apparatus 102, a handover success message that includes the identification information a2 shared with the base station apparatus 101 (step S806). The base station apparatus 102 cannot interpret this identification information a2, thus transfers this identification information a2 to the base station apparatus 101 that is a handover source, makes an inquiry whether or not there is identification information associated with the identification information a2 from among identification information shared between the base station apparatus 101 and the base station apparatus 102 (step S807). In response to this inquiry, the base station apparatus 101 transmits the identification information a1 stored in association with the identification information a2, as a response to the inquiry, to the base station apparatus 102 (step S808). Accordingly, the base station apparatus 102 can recognize that the identification information a2 is associated with the communication parameter A1, and, as a result, connection for communication that uses the communication parameter A1 is established between the terminal apparatus 121 and the base station apparatus 101 (step S611).

As described above, a communication parameter that is to be used when the base station apparatus 102 communicates with the terminal apparatus 121 and identification information associated with the communication parameter are shared between the terminal apparatus 121 and the base station apparatus 102 (or the base station apparatus 101) that is a candidate for handover destination, and conditional handover is executed using the identification information. Accordingly, communication parameter that is to be used by the terminal apparatus 121 can be accurately recognized by the base station apparatus 102 that is a handover destination, and thus it is possible to prevent communication between the terminal apparatus 121 and the base station apparatus 102 from being disabled after handover.

According to the present invention, it is possible to prevent mismatch between communication parameters that are respectively used by a terminal apparatus and a base station apparatus that is a handover destination during handover.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A terminal apparatus comprising:
one or more processors; and
one or more memories that store a computer-readable instruction for causing, when executed by the one or more processors, the one or more processors to:
obtain, from a base station apparatus that is currently connected to the terminal apparatus, (i) a communication parameter for Radio Resource Control (RRC) that is to be used when the terminal apparatus is connected to a candidate base station apparatus that is a candidate for handover destination, (ii) identification information identifying the communication parameter for the RRC, and (iii) a condition for executing handover to the candidate base station apparatus; and
based on obtaining the communication parameter and the identification information from the base station apparatus that is currently connected to the terminal apparatus, transmit, to the candidate base station apparatus, a message that includes the identification information identifying the communication parameter for the RRC for use by the candidate base station to determine the communication parameter to communicate with the terminal apparatus, when handover to the candidate base station apparatus is performed based on the condition.

2. A base station apparatus that is a candidate for destination of handover to be performed by a terminal apparatus, the base station apparatus comprising:
one or more processors; and
one or more memories that store a computer-readable instruction for causing, when executed by the one or more processors, the one or more processors to:
notify another base station apparatus that is currently connected to the terminal apparatus of (i) a communication parameter for Radio Resource Control (RRC) that is to be used when the terminal apparatus is connected to the base station apparatus, and (ii) identification information identifying the communication parameter for the RRC;
receive, from the terminal apparatus, a message that includes the identification information identifying the communication parameter for the RRC, notified from the other base station apparatus to the terminal apparatus, when the terminal apparatus executes handover to the base station apparatus; and
communicate with the terminal apparatus using the communication parameter for the RRC if the identification information included in the message is associated with the communication parameter for the RRC that is notified.

3. The base station apparatus according to claim 2, wherein the one or more processors are configured to communicate with the terminal apparatus using the communication parameter for the RRC that is notified, if the identification information that is notified matches the identification information included in the message.

4. The base station apparatus according to claim 2, wherein the one or more processors are configured to notify the other base station apparatus of a first communication parameter for the RRC that is to be used when the terminal apparatus is connected to the base station apparatus and first identification information associated with the communication parameter for the RRC,
the one or more processors are configured to transmit second identification information included in the message, to the other base station apparatus,
the one or more processors are configured to receive third identification information corresponding to the second identification information from the other base station apparatus, and
the one or more processors are configured to communicate with the terminal apparatus using a communication parameter for the RRC that is notified, if the third identification information matches the first identification information.

5. The base station apparatus according to claim 2, wherein the one or more processors are configured to notify the terminal apparatus of a first communication parameter for the RRC that is to be used when the terminal apparatus is connected to the base station apparatus, via the other base station apparatus, and then notifies the terminal apparatus of a second communication parameter for the RRC changed from the first communication parameter for the RRC, and
the one or more processors are configured to communicate with the terminal apparatus using the first communication parameter for the RRC if the identification information included in the message is associated with the first communication parameter for the RRC.

6. The base station apparatus according to claim 2, wherein the one or more processors are configured to notify the terminal apparatus of a first communication parameter for the RRC that is to be used when the terminal apparatus is connected to the base station apparatus, via the other base station apparatus, and then notifies the terminal apparatus of a second communication parameter for the RRC changed from the first communication parameter for the RRC, via the other base station apparatus, and
the one or more processors are configured to discard the message if identification information included in the message is associated with the first communication parameter for the RRC.

7. The base station apparatus according to claim 2, wherein, if the identification information included in the message is not associated with the communication parameter for the RRC that is notified, the one or more processors are configured to discard the message.

8. The base station apparatus according to claim 6, wherein the one or more processors are further configured to:
generate a communication parameter for the RRC that is to be used for communication with the terminal apparatus and notifying the terminal apparatus of the generated communication parameter for the RRC, in addition to discarding the message, and
communicate with the terminal apparatus using the generated communication parameter for the RRC.

9. A control method that is executed by a terminal apparatus, the method comprising:
obtaining, from a base station apparatus that is currently connected to the terminal apparatus, (i) a communication parameter for Radio Resource Control (RRC) that is to be used when the terminal apparatus is connected to a candidate base station apparatus that is a candidate for handover destination, (ii) identification information identifying the communication parameter for the RRC, and (iii) a condition for executing handover to the candidate base station apparatus; and
based on obtaining the communication parameter and the identification information from the base station apparatus that is currently connected to the terminal apparatus, transmitting, to the candidate base station apparatus, a message that includes the identification information identifying the communication parameter for the RRC for use by the candidate base station to determine the communication parameter to communicate with the terminal apparatus, when handover to the candidate base station apparatus is performed based on the condition.

10. A control method that is executed by a base station apparatus that is a candidate for destination of handover to be performed by a terminal apparatus, the control method comprising,
notifying another base station apparatus that is currently connected to the terminal apparatus of (i) a communication parameter for Radio Resource Control (RRC) that is to be used when the terminal apparatus is connected to the base station apparatus, and (ii) identification information identifying the communication parameter for the RRC;
receiving, from the terminal apparatus, a message that includes the identification information identifying the communication parameter for the RRC, notified from the other base station apparatus to the terminal apparatus, when the terminal apparatus executes handover to the base station apparatus; and communicating with the terminal apparatus using the communication parameter for the RRC if the identification information included in the message is associated with the notified communication parameter for the RRC.

11. A non-transitory computer-readable storage medium that stores a program for causing a computer provided in a terminal apparatus to:
   obtain, from a base station apparatus that is currently connected to the terminal apparatus, (i) a communication parameter for Radio Resource Control (RRC) that is to be used when the terminal apparatus is connected to a candidate base station apparatus that is a candidate for handover destination, (ii) identification information identifying the communication parameter for the RRC, and (iii) a condition for executing handover to the candidate base station apparatus; and
   based on obtaining the communication parameter and the identification information from the base station apparatus that is currently connected to the terminal apparatus, transmit, to the candidate base station apparatus, a message that includes the identification information identifying the communication parameter for the RRC for use by the candidate base station to determine the communication parameter to communicate with the terminal apparatus, when handover to the candidate base station apparatus is performed based on the condition.

12. A non-transitory computer-readable storage medium that stores a program for causing a computer provided in a base station apparatus that is a candidate for destination of handover to be performed by a terminal apparatus to:
   notify another base station apparatus that is currently connected to the terminal apparatus of (i) a communication parameter for Radio Resource Control (RRC) that is to be used when the terminal apparatus is connected to the base station apparatus and (ii) identification information identifying the communication parameter for the RRC;
   receive, from the terminal apparatus, a message that includes the identification information identifying the communication parameter for the RRC, notified from the other base station apparatus to the terminal apparatus, when the terminal apparatus executes handover to the base station apparatus; and
   communicate with the terminal apparatus using the communication parameter for the RRC if the identification information included in the message is associated with the notified communication parameter for the RRC.

13. The terminal apparatus according to claim 1,
   wherein the communication parameter for the RCC includes at least one of a frequency bandwidth or a number of MIMO layers.

14. The terminal apparatus according to claim 1,
   wherein the one or more processors are further configured to obtain, from the base station apparatus that is currently connected to the terminal apparatus, information indicating the candidate base station in addition to the communication parameter for the RRC and the condition.

15. The base station apparatus according to claim 2,
   wherein the communication parameter for the RCC includes at least one of a frequency bandwidth or a number of MIMO layers.

16. The terminal apparatus according to claim 1,
   wherein the communication parameter for the RRC and the condition are obtained from the base station apparatus that is currently connected to the terminal apparatus using a RRC Reconfiguration message.

17. The terminal apparatus according to claim 16,
   wherein the message that includes the identification information is a RRC Reconfiguration Complete message, the identification information is a RRC Transaction ID, and the RRC Reconfiguration Complete message including the RRC Transaction ID is transmitted to the candidate base station apparatus.

18. The base station apparatus according to claim 2,
   wherein the message that includes the identification information is a RRC Reconfiguration message, the identification information is a RRC Transaction ID, and the RRC Reconfiguration message including the RRC Transaction ID is received from the terminal apparatus.

19. A control method for a wireless network system comprising a terminal apparatus currently connected to a base station apparatus and a candidate base station apparatus that is a candidate for destination of handover to be performed by the terminal apparatus, the method comprising:
   notifying, by the candidate base station, the base station apparatus that is currently connected to the terminal apparatus of (i) a communication parameter for Radio Resource Control (RRC) that is to be used when the terminal apparatus is connected to the candidate base station apparatus, and (ii) identification information identifying the communication parameter for the RRC;
   obtaining, by the terminal apparatus, from the base station apparatus that is currently connected to the terminal apparatus, (i) the communication parameter for Radio Resource Control (RRC) that is to be used when the terminal apparatus is connected to the candidate base station apparatus, (ii) the identification information identifying the communication parameter for the RRC, and (iii) a condition for executing handover to the candidate base station apparatus;
   based on obtaining, by the terminal apparatus, (i) the communication parameter and (ii) the identification information from the base station apparatus that is currently connected to the terminal apparatus, transmitting, by the terminal apparatus, to the candidate base station apparatus, a message that includes (ii) the identification information identifying the communication parameter for the RRC for use by the candidate base station to determine the communication parameter to communicate with the terminal apparatus, when handover to the candidate base station apparatus is performed based on (iii) the condition;
   receiving, by the candidate base station, a message, from the terminal apparatus, that includes (ii) the identification information identifying the communication parameter for the RRC, notified from the candidate base station apparatus to the terminal apparatus, when the terminal apparatus executes handover to the base station apparatus; and
   communicating, by the candidate base station, with the terminal apparatus using the communication parameter for the RRC that is identified by using the identification information identifying the communication parameter for the RRC.

* * * * *